(12) United States Patent
Swanson

(10) Patent No.: US 6,619,333 B2
(45) Date of Patent: Sep. 16, 2003

(54) APPARATUS AND METHOD FOR USING THE EXISTING HYDROCARBON DISTRIBUTION, STORAGE AND DISPENSING INFRASTRUCTURES FOR THE PRODUCTION, DISTRIBUTION AND DISPENSING OF HYDROGEN

(76) Inventor: Richard Allan Swanson, 7657 El Pastel Dr., Dallas, TX (US) 75248

(*) Notice: Subject to any disclaimer, the term of this patent is extended or adjusted under 35 U.S.C. 154(b) by 0 days.

(21) Appl. No.: 10/073,651

(22) Filed: Feb. 13, 2002

(65) Prior Publication Data

US 2003/0037834 A1 Feb. 27, 2003

Related U.S. Application Data

(60) Provisional application No. 60/314,439, filed on Aug. 24, 2001.

(51) Int. Cl.$^7$ ................................................ B65B 1/04
(52) U.S. Cl. ........................ 141/4; 141/9; 141/98; 141/100; 48/197 FM; 48/199 FM; 48/127.1; 48/127.9; 48/61
(58) Field of Search ...................... 141/4, 9, 98, 100, 141/104, 83, 94, 192; 48/190, 191, 197 FM, 198.8–199 FM, 127.1, 127.9, 61; 585/943; 252/373, 376

(56) References Cited

U.S. PATENT DOCUMENTS 5,516,967 A * 5/1996 Pandey et al. ............ 48/198.1
5,660,602 A * 8/1997 Collier et al. ............... 48/127.3
6,162,267 A * 12/2000 Priegnitz et al. ......... 48/199 FM
6,203,587 B1 * 3/2001 Lesieur et al. ................ 48/61

* cited by examiner

Primary Examiner—Steven O. Douglas

(57) ABSTRACT

In order to provide hydrogen as a transportation fuel, service stations are provided with apparatus for performing the hydrocarbon to hydrogen conversion. The hydrocarbon product applied to the hydrocarbon to hydrogen converter can be distributed to the service station as gasoline/diesel fuel or as a separate hydrocarbon including natural gas. The hydrogen can be stored in a storage facility at the service station and dispensed to users as required. This distribution system eliminates the need for hydrocarbon to hydrogen converters in the each fuel cell powered automobile. This distribution system also eliminates the need for a separate dedicated hydrogen distribution system. In addition, the distribution of hydrogen can co-exist with the distribution of gasoline and diesel fuels providing for a convenient transition period. The carbon dioxide byproduct of the hydrocarbon to hydrogen conversion can be separately collected and forwarded to facilities requiring this material thus eliminating the emission of polluting gases if the hydrogen from hydrocarbon conversion done on each fuel cell powered vehicle.

18 Claims, 2 Drawing Sheets

APPARATUS AND METHOD FOR USING THE EXISTING HYDROCARBON DISTRIBUTION, STORAGE AND DISPENSING INFRASTRUCTURES FOR THE PRODUCTION, DISTRIBUTION AND DISPENSING OF HYDROGEN

This application claims the benefit of U.S. Provisional Application No. 60/314,439, filed Aug. 24, 2001.

BACKGROUND OF THE INVENTION

1. Field of the Invention

This invention relates generally to the transport and distribution of transportation fuels and, more particularly, to the transport and distribution of hydrogen as a transportation fuel.

2. Description of the Related Art

Hydrocarbons are largely used for transportation fuels in internal combustion engines. As such there is a well established storage, distribution and dispensing infrastructure in place.

Gasoline and diesel fuels are transported, stored and dispensed economically and safely using this infrastructure. Similarly, natural gas has a well established storage and distribution system.

Referring to FIG. 1, a schematic diagram of the distribution of the transportation fuels (e.g. gasoline, diesel, etc.) is shown. A fuel production system, 11, includes the apparatus for transporting the feedstocks from the source to a production facility. At the production facility, the feedstocks are processed and distilled into various transportation fuels. The hydrocarbon fuel storage, distribution and transportation system, 12, includes the facilities and equipment downstream of the production facility needed to store, transport the transportation fuels to service stations. The service station, 14, includes storage facilities that store products until needed. From the storage facilities in the service station, the fuels are dispensed to the vehicles by dispensing units, 15.

The storage and distribution system for natural gas is simple and largely consists of compressors, pipework and valves and meters. It is usually piped directly to end users.

It is envisaged that in the future, hydrocarbon fuels will be replaced by hydrogen as fuel cells become viable as an electricity generator that in turn will be used as the motive energy for vehicles. Therefore, a safe and economical supply of hydrogen will be necessary in order to provide fuel for these vehicles using fuel cells.

Neither the existing hydrocarbon distribution and dispensing system, nor the existing natural gas distribution and dispensing system in their current forms are capable of distributing and dispensing hydrogen. The trucks that transport hydrocarbons and the storage facilities that store hydrocarbons are not able to transport and store hydrogen. The existing natural gas facilities could be converted to distribute hydrogen but would then be unusable for natural gas at the same time as it is a single product system. Therefore, a whole new system of transportation and storage would be necessary to transport and store hydrogen. In addition, this new system would have to run in parallel for some years while the transition from liquid hydrocarbon fuels to hydrogen as a fuel was made.

In order to overcome this problem of the distribution and storage of hydrogen, proposals are being made and plans are being drawn up for each fuel cell powered vehicle, 16, to have a hydrocarbon to hydrogen converter, 17, as a part of each vehicle and thus retain the current liquid hydrocarbon distribution and storage system.

Although this is a means of overcoming the problem of hydrogen distribution and storage, it presents a number of other problems. These problems can be put in three categories.

The first problem is one of an increased requirement for capital. In this plan, instead of simply supplying the hydrogen fuel that the vehicles will use, each vehicle will require a converter, 17, to change the hydrocarbon into hydrogen. This will increase the cost of each and every vehicle.

The second problem is that of emissions of carbon monoxide or carbon dioxide. In the process of producing hydrogen from hydrocarbons, either carbon monoxide, or more commonly, carbon dioxide is produced. In the proposed scheme whereby hydrogen is produced in each vehicle, carbon dioxide or carbon monoxide would also be produced and released (not captured) to the atmosphere, 21. Both of these gases are pollutants and injurious to the environment. (In order to capture these fugitive pollutants, yet more equipment in the vehicle would be required, as well as an environmentally acceptable infrastructure to dispose of these gases.)

The third problem of this scheme is one of increased complexity for each vehicle. The necessity to produce hydrogen from hydrocarbons in each vehicle increases the complexity of each vehicle appreciably. A storage tank would have to be added for the hydrocarbons, a hydrogen from hydrocarbon converter, 17, that makes hydrogen from hydrocarbons would have to be added as well as all the interconnections and controls that are associated with this equipment would also be necessary. Not only are capital costs increased, the maintenance of the vehicle would be increased as well. The mass of the vehicle would be increased and thus its efficiency decreased. The increased complexity of the vehicle would also require the consideration of safety for these additional systems and perhaps yet more equipment, further increasing capital costs and maintenance.

A requirement has therefore been recognized for apparatus and an associated method having the feature that hydrogen as a transportation fuel can be transported, distributed and supplied efficiently, economically and safely. It would be a further feature of the present invention to eliminate the need for hydrocarbon to hydrogen converters in each vehicle. It would be yet another feature of the present invention to use the existing liquid hydrocarbon transportation fuel infrastructure and/or natural gas distribution infrastructure to distribute hydrogen. It is a more particular feature of the present invention to provide local service stations with hydrocarbon to hydrogen converter units to provide hydrogen. Yet another feature of the present invention would be to capture the otherwise fugitive pollutants.

SUMMARY OF THE INVENTION

The aforementioned and other features of the present invention are accomplished, according to the present invention, by locating hydrogen from hydrocarbon equipment in existing local hydrocarbon storage and dispensing stations (service stations). The equipment would produce hydrogen that would be sold to power fuel cells and other apparatus requiring hydrogen as a fuel, including fuel cell powered vehicles. The byproducts of the hydrogen from hydrocarbon producing equipment would also be captured. The inclusion of hydrogen from hydrocarbon equipment in every vehicle can thereby be eliminated. In addition, the existing hydrocarbon distribution system can continue to use the existing facilities and the two distribution systems of the two forms of transportation fuels can co-exist smoothing the transition from the hydrocarbon fuels to hydrogen as fuels.

Other features and advantages of the present invention will be more clearly understood upon reading of the following description and claims along with the drawings.

DESCRIPTION OF THE PREFERRED EMBODIMENT(S)

1. Detailed Description of the Figures

Hydrocarbon fuel production system for the purpose of this invention are all those facilities that provide feedstocks to refineries and refineries and other production facilities that produce hydrocarbon fuels. These facilities include wells, pipelines, separations plants, feedstock transportation facilities, refineries and all associated support and ancillary devices.

Hydrocarbon storage, distribution and transportation system for the purpose of this invention are all those facilities that are downstream from hydrocarbon production system that store, distribute and transport hydrocarbon fuels. These downstream facilities include but are not limited to: tanks, pipelines, depots, terminals, trucks and all associated support and ancillary devices.

Natural gas distribution system for the purpose of this invention are all those facilities that are downstream of production, separation, sweetening, compression and storage facilities that convey natural gas from the provider to the consumer. It largely consists of pipework, valves and meters.

Service stations for the purpose of this invention are those facilities that store and dispense hydrocarbon fuels to customers. Service stations include but are not limited to tanks, pumps, pipework, dispensing units, retail selling equipment and all associated support and ancillary devices.

Dispensing units for the purpose of this invention are those units that draw product from the service station tanks, measure the quantity being sold and load the product to the customer. Dispensing units include but are not limited to pumps, motors, measuring devices, hoses, nozzles, valves, displays, software, electronic chips and all associated support and ancillary devices.

Figure 1:
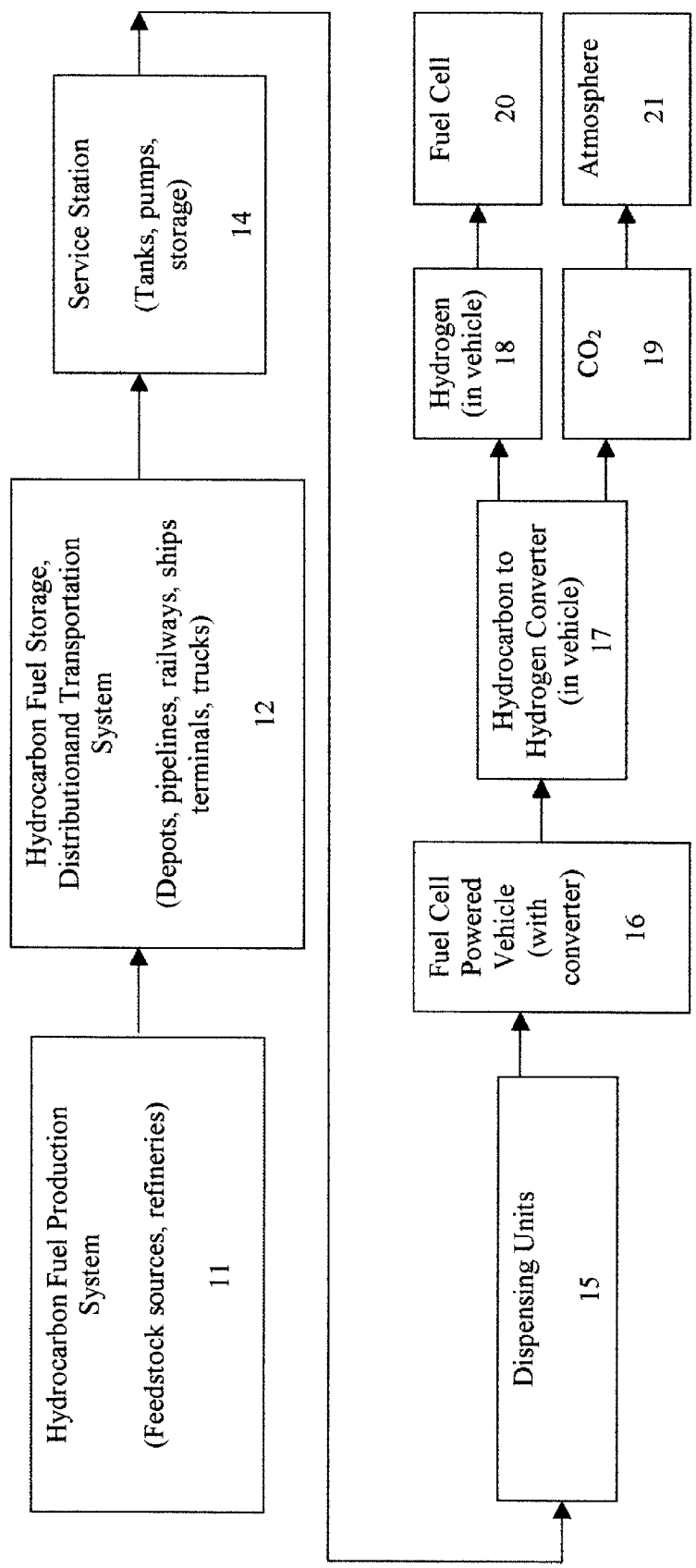
FIG. 1 is a schematic representation of the gasoline/diesel (hydrocarbon) distribution system for transportation fuel according to the prior art. This figure does not show the natural gas distribution system due to its inherent simplicity.

FIG. 1 has been described with respect to the related art.

Figure 2:
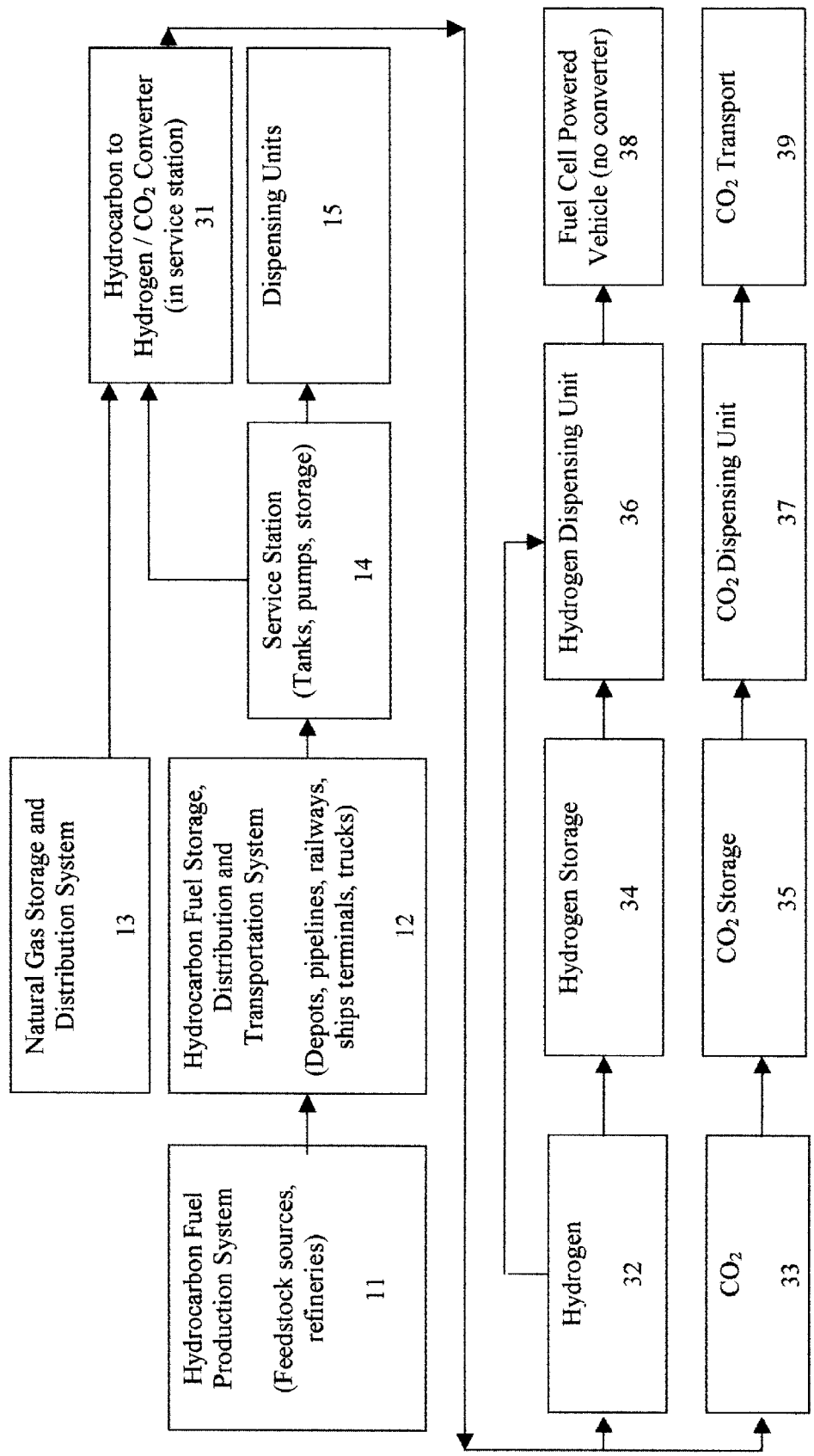
FIG. 2 is a schematic representation of the hydrogen distribution system according to the present invention.

Referring to FIG. 2, the distribution system for hydrogen according to the present invention is shown. The distribution system shown in FIG. 1 is typical for transportation fuels. The natural gas distribution system, 13, is typical for natural gas. If preferable, in addition to the typical hydrocarbon transportation products stored in the service station, 14, a class of hydrocarbon product(s) specifically designed for the production of hydrogen could be stored. This could be a liquid transportation fuel, another liquid hydrocarbon (such as ethanol or methanol). An appropriate class of hydrocarbon liquid or gas is applied from either the natural gas distribution system, 13, or the service station storage facility, 14, to a hydrocarbon to hydrogen/carbon dioxide converter, 21. The hydrogen gas, 32, is stored in a hydrogen storage unit, 34, or is dispensed directly using the hydrogen dispensing unit, 36, while the carbon dioxide is stored in a carbon dioxide storage facility, 35. Similarly, the carbon dioxide is dispensed from the carbon dioxide storage unit, 35, by the carbon dioxide dispensing unit, 37.

The hydrocarbon to hydrogen conversion is known in the prior art. Examples of this process are described, for example, in U.S. Pat. No. 6,162,267 entitled PROCESS FOR GENERATION OF PURE HYDROGEN FOR USE WITH FUEL CELLS, issued Dec. 19, 2000 in the name of Priegnitz et al and U.S. Pat. No. 6,203,587 B1. entitled COMPACT FUEL GAS REFORMER ASSEMBLAGE issued Mar. 20, 2001 in the name of Lesieur et al.

2. Operation of the Preferred Embodiment

This invention utilizes the existing liquid hydrocarbon distribution and storage infrastructure or the existing natural gas distribution infrastructure which obviates the need to have hydrogen from hydrocarbon conversion equipment in each vehicle that requires hydrogen as a fuel. This invention will accomplish this by having hydrocarbon to hydrogen conversion equipment at each existing hydrocarbon service station instead of in every vehicle. This will decrease the requirement for such equipment by hundreds fold and probably by thousands fold.

This invention therefore has all the benefits of retaining the existing hydrocarbon and/or natural gas distribution and storage infrastructure while, at the same time with relatively modest capital investment, making it possible for this existing infrastructure to provide hydrogen to vehicles and other devices using hydrogen as a fuel without requiring each of those vehicles or devices to have hydrogen from hydrocarbon producing equipment.

In addition to eliminating the capital required to have hydrogen from hydrocarbon producing equipment in each vehicle, it is obvious that the complexity of the vehicles will be reduced with the attendant benefits—less capital cost, less complexity, increased safety and reduced maintenance and operating costs. The hydrogen could be stored in a pressure tank or in an enclosure containing a metal hydride within which the hydrogen would be stored or would utilize some other means of storage. This would obviate the requirement for a hydrocarbon tank in addition to a hydrogen storage device on the vehicle.

In addition to these benefits of having hydrogen from hydrocarbon producing equipment at a service station instead of in a vehicle, it will be possible to capture the byproducts of this process, namely carbon monoxide or carbon dioxide, instead of releasing them to the atmosphere. Capturing these byproducts will be appreciably reduce atmospheric pollution. The service station will also be able to realize an additional revenue stream by sale of the carbon monoxide or carbon dioxide to industries that use these gases.

This invention in no way infringes on or impairs the ability of the existing hydrocarbon distribution and storage system to continue to deliver hydrocarbon fuels to vehicles that require them or the natural gas distribution system to deliver gas to consumers, while at the same time allowing for a more economical, safer and environmentally superior means of supplying hydrogen to vehicles over that which is currently proposed and planned.

This invention alters the economics of fuel cell powered vehicles by making them less complex to build and operate and thus less costly; it maintains the ability of the hydrocarbon distribution and storage system to not only distribute hydrocarbons but also to distribute hydrogen as a fuel to vehicles and it also provides for an environmentally superior means of providing hydrogen from hydrocarbons by capturing the byproducts of this conversion and thus not allowing them to escape to the atmosphere. It also provides revenue streams from hydrogen and carbon monoxide or carbon dioxide to the service station operator.

There are various means to accomplish hydrocarbon to hydrogen/$CO_2$ conversion. These means include steam reforming, partial oxidation, membrane separation, combinations of these or other means. This patent leaves open what technology should be used for this purpose but anticipates the products of the conversion to be hydrogen and $CO_2$. This patent therefore is inclusive of all methods by which hydrogen may be derived from hydrocarbons. The feedstock for such a process will probably be a hydrocarbon distillate such as gasoline, diesel fuel, naphtha or other hydrocarbon liquid obtained from the crude oil refining process or other such processes, or from methanol, ethanol or natural gas, or combination thereof.

There are various means to store hydrogen in compressed forms or at atmospheric pressure. This patent leaves open what technology is used to store both the hydrogen and other gases that may be generated as a result of the production of hydrogen from hydrocarbon conversion process. This patent is therefore inclusive of all methods of hydrogen storage.

There are various means to store carbon dioxide. This patent leaves open what technology is used to store both the carbon dioxide and other gases that may be generated as a result of the production of hydrogen from the hydrocarbon conversion process. This patent is therefore inclusive of all methods of carbon dioxide storage.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A method for the distribution of hydrogen to vehicles powered by fuel cells, the method comprising:
    storing at least one selected hydrocarbon at a local distribution facility
    producing hydrogen by a hydrocarbon-to-hydrogen process at the local distribution facility; and
    dispensing the hydrogen into a storage unit in the vehicles.

2. The method as recited in claim 1 further comprising storing hydrogen produced by the hydrocarbon to hydrogen process at the local distribution facility.

3. The method as recited in claim 1 wherein the hydrocarbon to hydrogen process produces at least one byproduct, the method further comprising storing the byproduct of the hydrocarbon to hydrogen produced at the local facility.

4. The method as recited in claim 3 further comprising dispensing the byproduct(s) of the hydrocarbon process into a transportation vehicle.

5. The method as recited in claim 1 further comprising storing and dispensing at least one selected hydrocarbon to vehicle.

6. The method as recited in claim 5 wherein the hydrocarbon and the selected hydrocarbon may be the same hydrocarbon.

7. A local distribution facility for providing fuel to automotive vehicles powered by a fuel cell, the facility comprising:
    storage apparatus storing at least one selected hydrocarbon product;
    a converter for converting the selected hydrocarbon product to hydrogen (and associated byproduct(s)); and
    a dispenser for dispensing the hydrogen converted from the selected hydrocarbon product to a storage unit in the vehicle.

8. The local distribution facility as recited in claim 7 further comprising a storage unit for storing the hydrogen from the converter.

9. The local distribution facility as recited in claim 7 further comprising dispensing apparatus for storing and dispensing to an automotive vehicle at least one preselected hydrocarbon product.

10. The local distribution facility as recited in claim 7 wherein the hydrocarbon to hydrogen conversion results in at least one by-product, the local distribution system including a second storage apparatus for capturing and storing the by-product.

11. The local distribution facility as recited in claim 10 further comprising a second dispensing unit for transferring the byproduct to a transportation unit.

12. The local distribution system as recited in claim 7 wherein the selected hydrocarbon and the preselected hydrocarbon are the same hydrocarbon.

13. The local distribution system as recited in claim 10 wherein the byproduct is selected from the group consisting of carbon monoxide and carbon dioxide.

14. A system for the distribution of hydrogen to vehicles powered by a fuel cell, the system comprising:
    a hydrocarbon fuel production system, the production system providing at least one hydrocarbon material;
    a distribution system; and
    at least one local facility, the distribution system transferring the hydrocarbon material from the production system to the local facility;
    the local facility including:
        a storage unit for storing the hydrocarbon material;
        a converter unit for converting the hydrocarbon material to hydrogen; and
        a dispenser unit for dispensing the hydrogen to storage units in the vehicles.

15. The system as recited in claim 14 wherein the local facility further includes a second storage unit for storing the hydrogen prior to dispensing the hydrogen to vehicles.

16. The system recited in claim 14 wherein the local facility includes a second dispensing unit for dispensing hydrocarbons to vehicles.

17. The system as recited in claim 16 wherein the local facility includes a third storage unit, the third unit storing a second hydrocarbon material, the second hydrocarbon material being dispensed by the second dispensing unit.

18. The system as recited in claim 14 wherein the converter unit generates at least one byproduct when converting the hydrocarbon material to hydrogen, the local facility further including a second storage unit for storing the byproduct.

* * * * *